(12) United States Patent
Kanda et al.

(10) Patent No.: US 9,612,426 B2
(45) Date of Patent: Apr. 4, 2017

(54) IMAGING LENS AND IMAGING APPARATUS

(71) Applicant: FUJIFILM Corporation, Tokyo (JP)

(72) Inventors: Hideo Kanda, Saitama-ken (JP); Tomoyuki Baba, Saitama-ken (JP); Takashi Suzuki, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 14/625,056

(22) Filed: Feb. 18, 2015

(65) Prior Publication Data

US 2015/0160443 A1 Jun. 11, 2015

Related U.S. Application Data

(63) Continuation of application No. PCT/JP2013/004237, filed on Jul. 9, 2013.

(30) Foreign Application Priority Data

Aug. 21, 2012 (JP) .................. 2012-182361

(51) Int. Cl.
| | |
|---|---|
| G02B 15/14 | (2006.01) |
| G02B 15/16 | (2006.01) |
| G02B 9/64 | (2006.01) |
| G02B 13/16 | (2006.01) |

(52) U.S. Cl.
CPC ............. G02B 15/161 (2013.01); G02B 9/64 (2013.01); G02B 13/16 (2013.01)

(58) Field of Classification Search
CPC .................................. G02B 5/005; G02B 9/04
USPC .................................................. 359/642–830
See application file for complete search history.

(56) References Cited

U.S. PATENT DOCUMENTS

| | | | |
|---|---|---|---|
| 5,835,286 | A | 11/1998 | Yamanashi |
| 7,706,087 | B2 | 4/2010 | Obama |
| 8,213,096 | B2 | 7/2012 | Tsutsumi |
| 2002/0041541 | A1 | 4/2002 | Tsukada et al. |
| 2003/0053220 | A1 | 3/2003 | Sensui |

(Continued)

FOREIGN PATENT DOCUMENTS

| | | |
|---|---|---|
| CN | 201903688 | 7/2011 |
| FR | 2905728 | 3/2008 |

(Continued)

OTHER PUBLICATIONS

German Office Action dated Feb. 2, 2016; File No. 11 2013 004 108.1.

(Continued)

Primary Examiner — Mahidere Sahle
(74) Attorney, Agent, or Firm — Young & Thompson

(57) ABSTRACT

An imaging lens consists of a front group having positive refractive power as a whole and a rear group in this order from an object side. The front group consists of three positive lenses, a negative lens with its concave surface facing an image side, a positive lens with its convex surface facing the object side, a negative lens with its concave surface facing the image side, a stop, a negative lens with its concave surface facing the object side and plural positive lenses in this order from the object side. The rear group has positive refractive power and consists of a positive lens and a negative lens in this order from the object side.

19 Claims, 9 Drawing Sheets

EXAMPLE 1

(56) References Cited

U.S. PATENT DOCUMENTS

| | | | |
|---|---|---|---|
| 2005/0162756 A1 | 7/2005 | Harada | |
| 2006/0077569 A1 | 4/2006 | Harada | |
| 2011/0304929 A1* | 12/2011 | Tsutsumi | ............... G02B 13/14 |
| | | | 359/784 |

FOREIGN PATENT DOCUMENTS

| | | |
|---|---|---|
| JP | 01-237611 | 9/1989 |
| JP | 08-201692 | 8/1996 |
| JP | 09-61708 | 3/1997 |
| JP | 2001-318309 | 11/2001 |
| JP | 2002-318347 | 10/2002 |
| JP | 2008-020657 | 1/2008 |
| JP | 2009-058651 | 3/2009 |
| JP | 2010-175628 | 8/2010 |
| JP | 2011-170128 | 9/2011 |
| JP | 2012-168456 | 9/2012 |

OTHER PUBLICATIONS

International Search Report, PCT/JP2013/004237, Oct. 29, 2013.
Chinese Office Action dated May 4, 2016, with partial English translation; Application No. 201380042983.9.
Chinese Official Action—2013800429839—Dec. 13, 2016.

\* cited by examiner

FIG.1 EXAMPLE 1
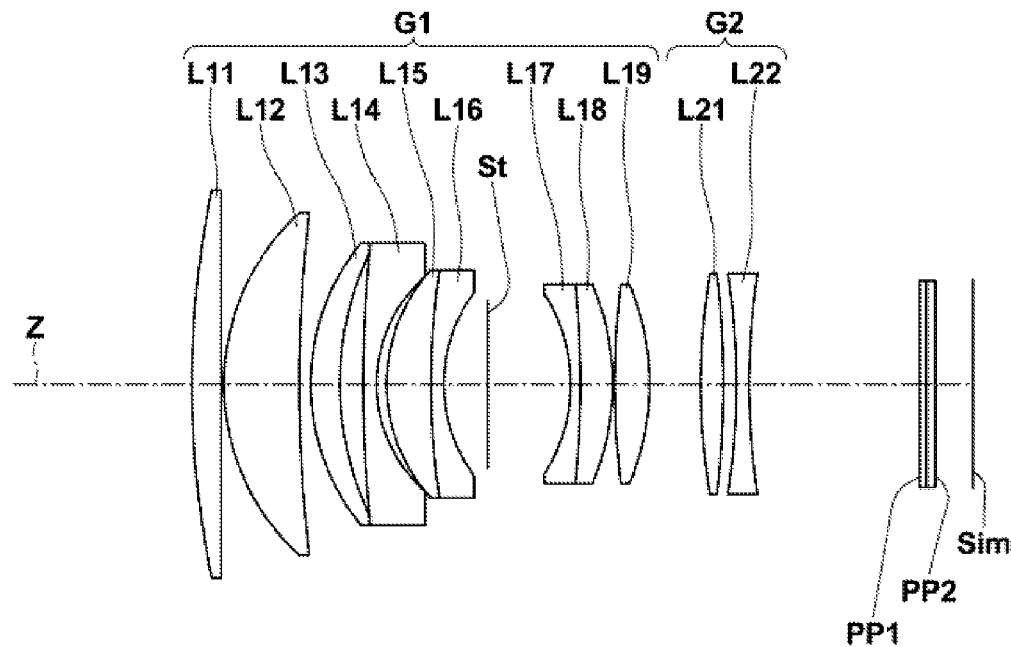
FIG.2 EXAMPLE 1
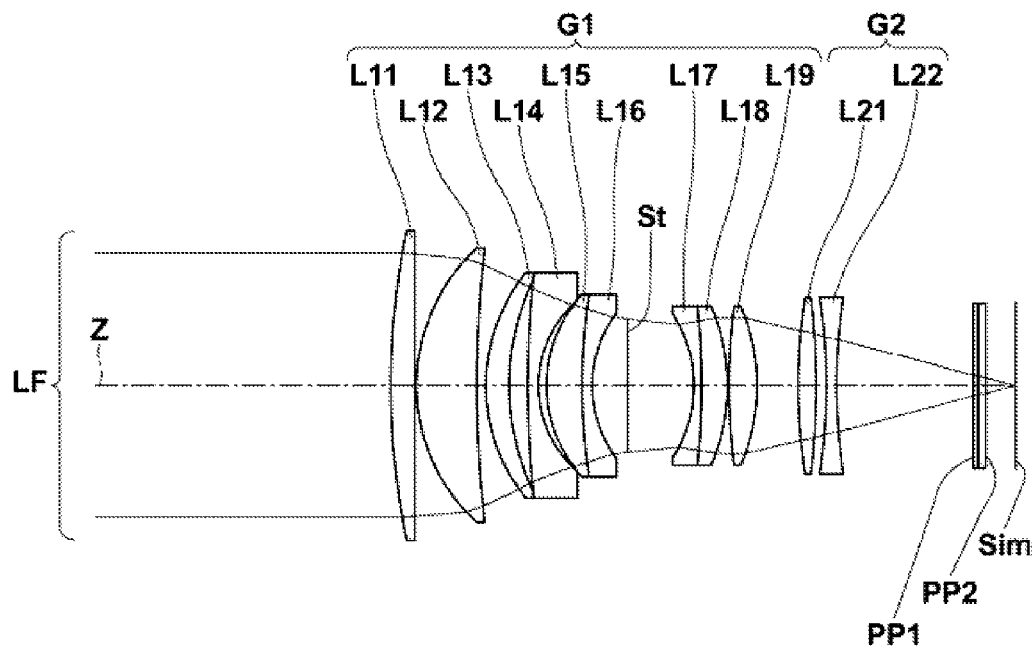

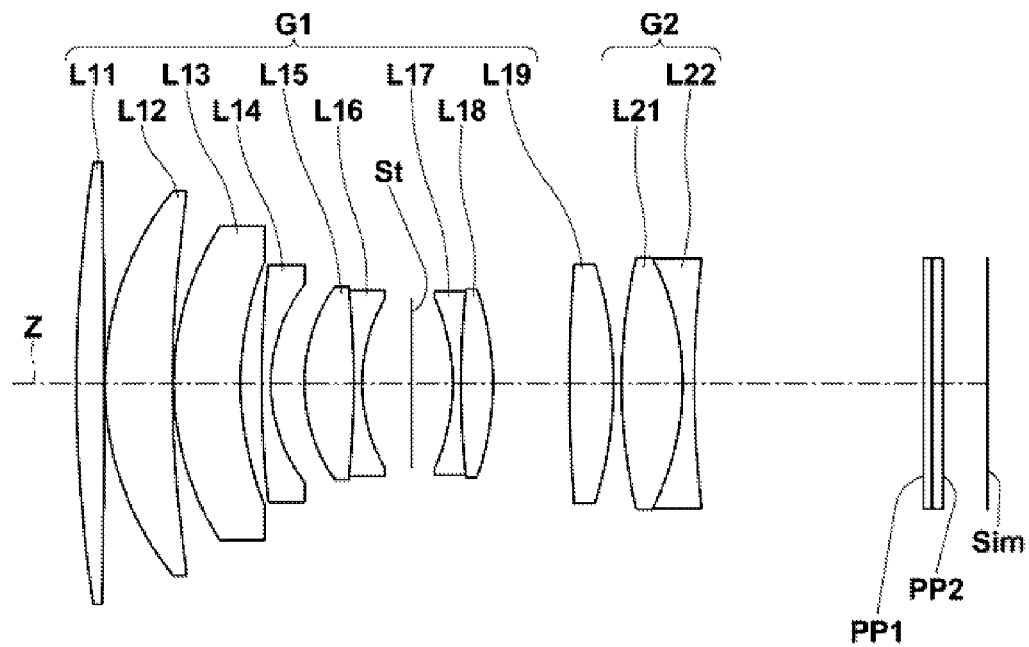
FIG.3 EXAMPLE 2
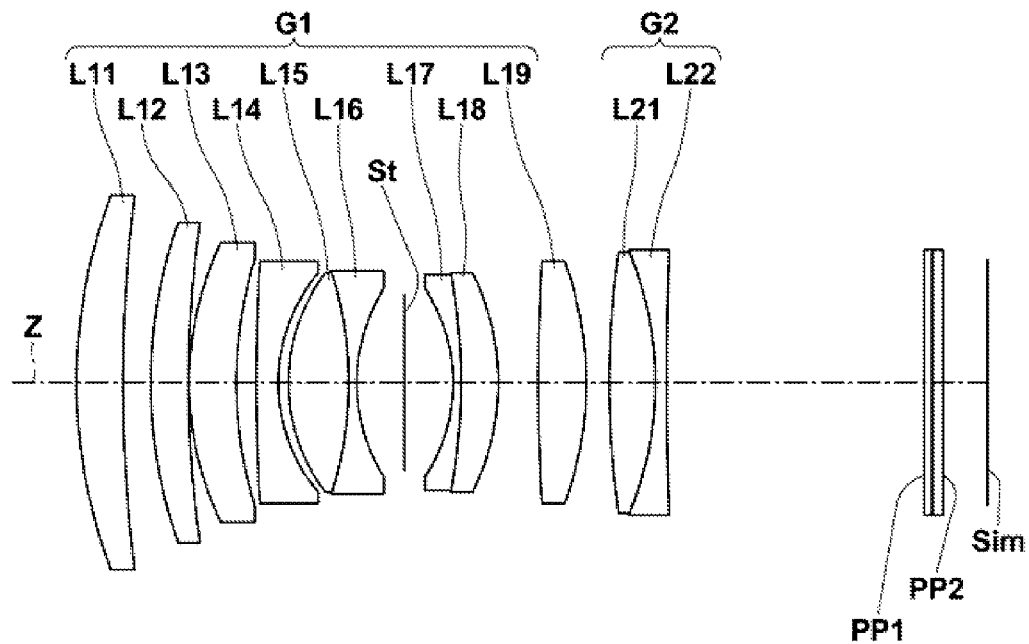
FIG.4 EXAMPLE 3

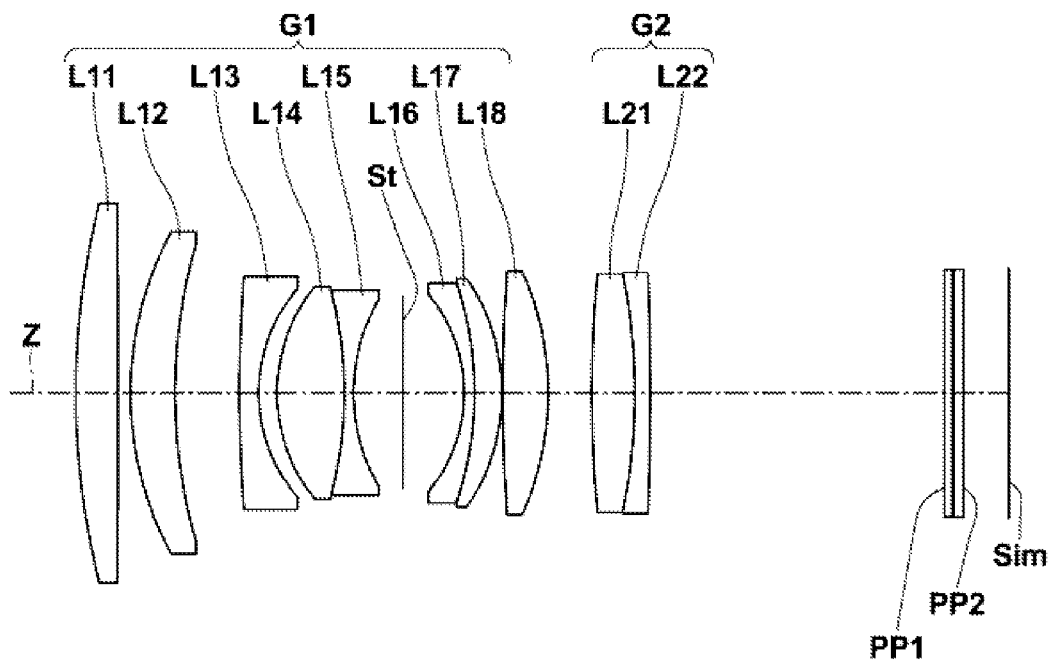
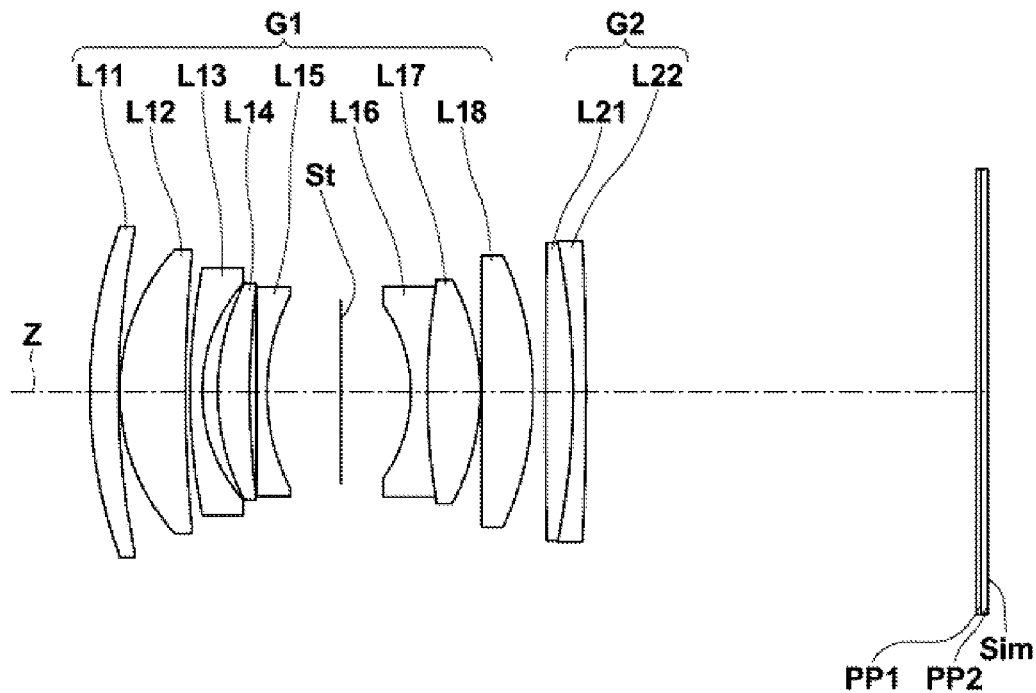

IMAGING LENS AND IMAGING APPARATUS

CROSS-REFERENCE TO RELATED APPLICATIONS

This application is a Continuation of PCT International Application No. PCT/JP2013/004237 filed on Jul. 9, 2013, which claims priority under 35 U.S.C. §119(a) to Japanese Patent Application No. 2012-182361 filed on Aug. 21, 2012. Each of the above applications is hereby expressly incorporated by reference, in its entirety, into the present application.

BACKGROUND OF THE INVENTION

Field of the Invention

The present invention relates to an imaging lens and an imaging apparatus. In particular, the present invention relates to an imaging lens used in electronic cameras, such as a digital camera, a camera for broadcasting, a camera for surveillance and a camera for film making, and an imaging apparatus including the imaging lens.

Description of the Related Art

As an imaging lens used in an imaging apparatus, such as a video camera and an electronic still camera, which uses an imaging device, such as a CCD (Charge Couple Device) and a CMOS (Complementary Metal Oxide Semiconductor), as a recording medium, imaging lenses, for example, as disclosed in Japanese Unexamined Patent Publication No. 8(1996)-201692 (Patent Document 1), Japanese Unexamined Patent Publication No. 2008-020657 (Patent Document 2), Japanese Unexamined Patent Publication No. 2010-175628 (Patent Document 3), and Japanese Unexamined Patent Publication No. 2009-058651 (Patent Document 4) have been proposed.

SUMMARY OF THE INVENTION

As the definition of cameras became high in recent years, imaging lenses in which various aberrations are excellently corrected have become needed. Further, a demand for imaging lenses having small F-number FNo., which are so-called fast imaging lenses, has been increasing.

However, the imaging lens disclosed in Patent Document 1 has a large FNo., and has not satisfied such demands.

The imaging lenses disclosed in Patent Documents 2 through 4 have small FNo. However, correction of astigmatism and curvature of field are insufficient. Therefore, the imaging lenses are not regarded as having high performance.

In view of the aforementioned circumstances, it is an object of the present invention to provide an imaging lens having a small FNo., and in which various aberrations are excellently corrected, and also an imaging apparatus including this lens.

An imaging lens of the present invention consists of a front group having positive refractive power as a whole and a rear group in this order from an object side. Further, the front group consists of two or three positive lenses, a negative lens with its concave surface facing an image side, a positive lens with its convex surface facing the object side, a negative lens with its concave surface facing the image side, a stop, a negative lens with its concave surface facing the object side and plural positive lenses in this order from the object side. Further, the rear group has positive refractive power and consists of a positive lens and a negative lens in this order from the object side.

In the imaging lens of the present invention, it is desirable that focusing is performed by moving at least the front group in the direction of an optical axis.

Further, it is desirable that each of the two or three positive lenses closest to the object side in the front group has a convex surface facing the object side.

Further, it is desirable that the number of the plural positive lenses in the front group arranged toward the image side of the stop is two.

Further, it is desirable that the number of the plural positive lenses in the front group arranged toward the image side of the stop is two, and that each of the two positive lenses has its convex surface facing the image side.

Further, it is desirable that a first negative lens counted from the object side in the front group satisfies the following conditional expression:

$$-4 < f/f1n < -1 \quad (1),$$ where f: a focal length of an entire system, and
f1n: a focal length of the first negative lens counted from the object side in the front group.

Further, it is desirable that an air lens between a first negative lens counted from the object side in the front group and a positive lens that is immediately after this negative lens satisfies the following conditional expression:

$$-0.4 < (Rnr-Rpf)/(Rnr+Rpf) < 0.2 \quad (2),$$ where

Rnr: a curvature radius of an image-side surface of the first negative lens counted from the object side in the front group, and
Rpf: a curvature radius of an object-side surface of the positive lens that is immediately after the first negative lens counted from the object side in the front group.

It is desirable that the front group satisfies the following conditional expression:

$$0.6 < f/f1 < 1.0 \quad (3),$$ where f: a focal length of an entire system, and
f1: a focal length of the front group.

Further, it is desirable that the rear group satisfies the following conditional expression:

$$0.1 < f/f2 < 0.5 \quad (4),$$ where f: a focal length of an entire system, and
f2: a focal length of the rear group.

Further, it is desirable that the positive lens in the rear group has its convex surface facing the image side.

It is desirable that a first negative lens counted from the object side in the front group satisfies the following conditional expression:

$$-3 < f/f1n < -1.5 \quad (1)',$$ where f: a focal length of an entire system, and
f1n: a focal length of the first negative lens counted from the object side in the front group.

Further, it is desirable that an air lens between a first negative lens counted from the object side in the front group and a positive lens that is immediately after this negative lens satisfies the following conditional expression:

$$-0.25 < (Rnr-Rpf)/(Rnr+Rpf) < 0.1 \quad (2)',$$ where

Rnr: a curvature radius of an image-side surface of the first negative lens counted from the object side in the front group, and
Rpf: a curvature radius of an object-side surface of the positive lens that is immediately after the first negative lens counted from the object side in the front group.

Further, it is desirable that the front group satisfies the following conditional expression:

$$0.7 < f/f1 < 0.95 \quad (3)'$$, where f: a focal length of an entire system, and
f1: a focal length of the front group.

Further, it is desirable that the rear group satisfies the following conditional expression:

$$0.15 < f/f2 < 0.4 \quad (4)'$$, where f: a focal length of an entire system, and
f2: a focal length of the rear group.

Further, it is desirable that Abbe numbers of all the negative lenses in the front group arranged toward the object side of the stop are greater than or equal to 35.

In this case, it is desirable that partial dispersion ratios of all the negative lenses in the front group arranged toward the object side of the stop are less than or equal to 0.6.

Here, partial dispersion ratio θgF is represented by the following equation:

$$\theta gF = (Ng - NF)/(NF - NC)$$, where

Ng: a refractive index for g-line,
NF: a refractive index for F-line, and
NC: a refractive index for C-line.

Further, it is desirable that an Abbe number of the lens closest to the object side in the front group is less than or equal to 35.

In this case, it is desirable that a partial dispersion ratio of the lens closest to the object side in the front group is greater than or equal to 0.58.

Further, it is desirable that the imaging lens includes a cemented lens consisting of the negative lens with its concave surface facing the object side and a positive lens with its convex surface facing the image side in the front group in this order from the object side immediately after the stop counted from the object side. Further, it is desirable that an Abbe number of each of the lenses constituting this cemented lens is less than or equal to 25.

An imaging apparatus of the present invention includes the imaging lens of the present invention.

An imaging lens of the present invention consists of a front group having positive refractive power as a whole and a rear group in this order from an object side. Further, the front group consists of two or three positive lenses, a negative lens with its concave surface facing an image side, a positive lens with its convex surface facing the object side, a negative lens with its concave surface facing the image side, a stop, a negative lens with its concave surface facing the object side and plural positive lenses in this order from the object side. Further, the rear group consists of a positive lens and a negative lens in this order from the object side. Therefore, it is possible to excellently correct various aberrations while the imaging lens has a small FNo.

The imaging apparatus of the present invention includes the imaging lens of the present invention. Therefore, bright video images with high image qualities are obtainable.

BRIEF DESCRIPTION OF THE DRAWINGS

FIG. 1 is a cross section illustrating the lens configuration of an imaging lens according to an embodiment of the present invention (also Example 1);
FIG. 2 is a diagram illustrating optical paths of the imaging lens;
FIG. 3 is a cross section illustrating the lens configuration of an imaging lens in Example 2 of the present invention;
FIG. 4 is a cross section illustrating the lens configuration of an imaging lens in Example 3 of the present invention;
FIG. 5 is a cross section illustrating the lens configuration of an imaging lens in Example 4 of the present invention;
FIG. 6 is a cross section illustrating the lens configuration of an imaging lens in Example 5 of the present invention.

DESCRIPTION OF THE PREFERRED EMBODIMENTS

Figure 7:
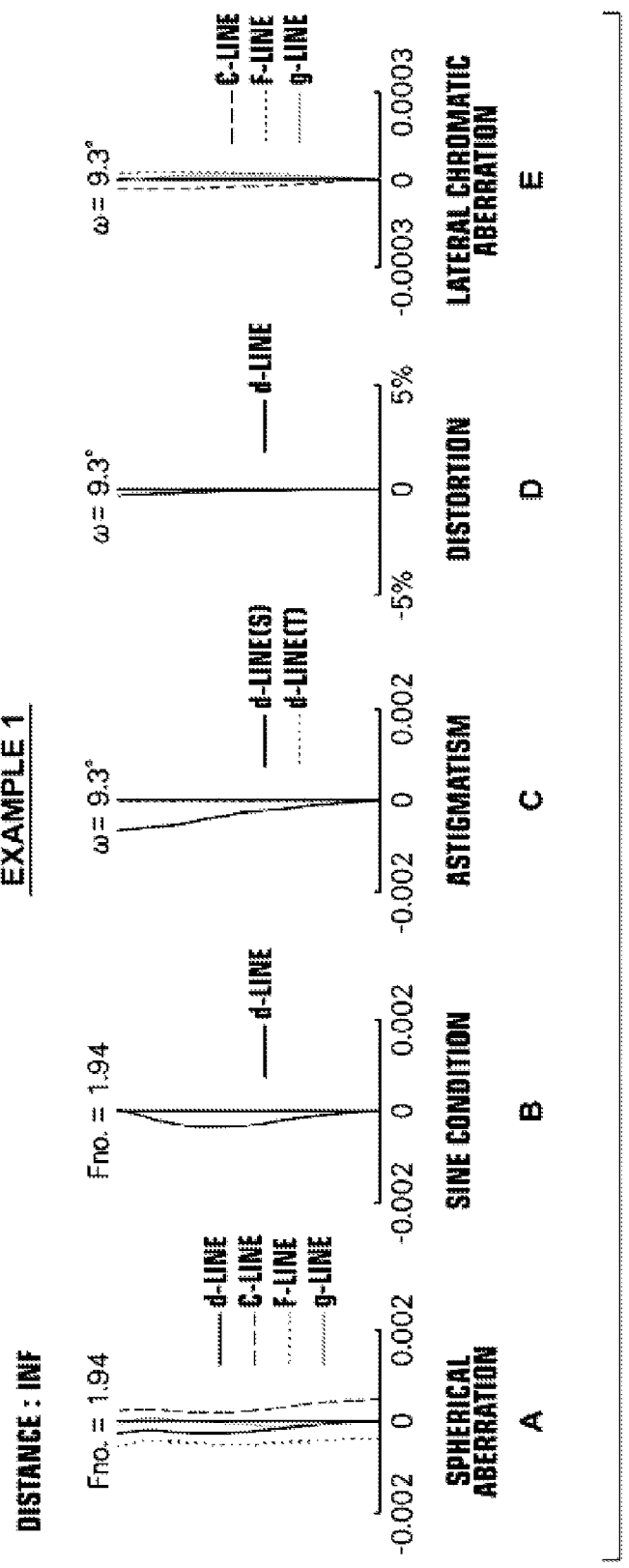
FIG. 7, Sections A through E are aberration diagrams of the imaging lens in Example 1 of the present invention.

Hereinafter, embodiments of the present invention will be described in detail with reference to drawings. FIG. 1 is a cross section illustrating the lens configuration of an imaging lens according to an embodiment of the present invention (also Example 1). FIG. 2 is a diagram illustrating optical paths of the imaging lens. The example of configuration illustrated in FIG. 1 and FIG. 2 is also the configuration of an imaging lens in Example 1, which will be described later. In FIG. 1 and FIG. 2, the left side is an object side, and the right side is an image side. In FIG. 2, axial rays LF from an object point at infinity are also illustrated.

This imaging lens consists of front group G1 having positive refractive power as a whole and rear group G2, along optical axis Z, in this order from an object side. Further, front group G1 consists of three positive lenses L11, L12, L13, negative lens L14 with its concave surface facing an image side, positive lens L15 with its convex surface facing the object side, negative lens L16 with its concave surface facing the image side, aperture stop St, negative lens L17 with its concave surface facing the object side and positive lenses L18, L19 in this order from the object side. Further, rear group G2 consists of positive lens L21 and negative lens L22 in this order from the object side. Here, aperture stop St illustrated in FIG. 1 and FIG. 2 does not necessarily represent the size nor the shape of the aperture stop, but a position on optical axis Z.

When this imaging lens is applied to an imaging apparatus, it is desirable to arrange a cover glass, a prism, and various filters, such as an infrared ray cut filter and a low-pass filter, between an optical system and image plane Sim based on the structure of a camera on which the lens is mounted. Therefore, FIG. 1 and FIG. 2 illustrate an example in which parallel-flat-plate-shaped optical members PP1, PP2, which are assumed to be such members, are arranged between rear group G2 and image plane Sim.

A Gauss-type lens, as disclosed in Patent Document 4, is widely known as an imaging lens having small FNo. However, it is still necessary to excellently correct a spherical aberration, curvature of field, astigmatism, a longitudinal chromatic aberration, a lateral chromatic aberration and the like to cope with the higher definition of cameras of recent years. It is necessary to pay attention to the arrangement of negative lenses to excellently correct these aberrations. In the Gauss-type lens, negative lenses are only a negative lens arranged before a stop close to the stop and a negative lens arranged after the stop close to the stop. In this configuration, only the two negative lenses must bear correction of aberrations generated in positive lenses arranged before the negative lenses and positive lenses arranged after the negative lenses. Therefore, there is a risk that it is impossible to sufficiently correct the aberrations. In contrast, if the aberrations are forced to be corrected, there is a risk that a high-order spherical aberration and secondary chromatic aberrations are generated.

In the imaging lens of the present invention, various aberrations are excellently corrected by arranging one more negative lens toward the front side of aperture stop St. Specifically, negative lens L14 is added, as a third lens counted from aperture stop St toward the object side. Since the height of axial marginal rays is high compared with a case of adding a negative lens for correcting aberrations immediately before aperture stop St, a spherical aberration, a longitudinal chromatic aberration and a lateral chromatic aberrations are corrected more effectively.

Further, positive refractive power closest to the object side in front group G1 is shared by two or three positive lenses (in this embodiment, three positive lenses L11, L12, L13), and that is advantageous to suppressing generation of a spherical aberration, and reducing FNo. Further, since it is possible to make the combined refractive power of these two or three lenses strong even if the refractive power of each of the lenses is weak, the configuration is advantageous also to reducing the total length.

Then, negative lens L14 with its concave surface facing the image side is arranged so as to follow these lenses, and that is advantageous to correcting a spherical aberration, a longitudinal chromatic aberration and a lateral chromatic aberration.

Then, positive lens L15 with its convex surface facing the object side, negative lens L16 with its concave surface facing the image side, aperture stop St, negative lens L17 with its concave surface facing the object side and positive lens L18 are arranged with aperture stop St between the lenses so as to follow negative lens L14. Therefore, these four lenses are configured nearly symmetrically with respect to aperture stop St. Hence, the configuration is advantageous to correcting a coma aberration and a lateral chromatic aberration. Further, both of the surfaces next to aperture stop St are concave surfaces facing aperture stop St, and that is advantageous to correcting curvature of field and astigmatism.

Then, positive lens L19 is arranged so as to follow these lenses. Since positive lens L19 can share positive refractive power with positive lens L18, which is immediately before positive lens L19, the configuration is advantageous to correcting a spherical aberration.

In the imaging lens of the present invention, it is desirable that focusing is performed by moving at least front group G1 in the direction of an optical axis. When focusing is performed in this manner, it is possible to suppress a fluctuation of curvature of field due to focusing. Here, focusing may be performed by moving only front group G1. Alternatively, the imaging lens may be configured so that rear group G2 is moved at a different speed from front group G1.

Further, it is desirable that each of all the two or three positive lenses closest to the object side in front group G1 has a convex surface facing the object side. That is advantageous to correcting a spherical aberration and astigmatism.

Further, it is desirable that the number of plural positive lenses in front group G1 arranged toward the image side of aperture stop ST is two. It is difficult to correct a spherical aberration by a positive lens. However, if the number of positive lenses is increased more than necessary, the cost becomes higher. Therefore, two positive lenses are desirable for the cost.

Further, it is desirable that rear group G2 has positive refractive power. That is advantageous to suppressing a fluctuation of curvature of field due to focusing.

Further, it is desirable that the number of plural positive lenses in front group G1 arranged toward the image side of aperture stop St is two, and that each of two positive lenses L18, L19 has its convex surface facing the image side. This configuration is advantageous to correcting astigmatism.

Further, it is desirable that lens L14, which is the first negative lens counted from the object side in front group G1, satisfies the following conditional expression (1). If the value is lower than the lower limit of this conditional expression (1), a high-order spherical aberration due to over-correction is generated. In contrast, if the value exceeds the upper limit of conditional expression (1), the configuration is disadvantageous to correcting a spherical aberration, a longitudinal chromatic aberration and a lateral chromatic aberration. When the following conditional expression (1)' is satisfied, more excellent characteristics are obtainable:

$$-4 < f/f1n < -1 \tag{1; and}$$

$$-3 < f/f1n < -1.5 \tag{1}', \text{where}$$

f: a focal length of an entire system, and
f1n: a focal length of the first negative lens counted from the object side in the front group.

It is desirable that an air lens between lens L14, which is a first negative lens counted from the object side in front group G1, and positive lens L15 that is immediately after this negative lens L14 satisfies the following conditional expression (2). If the value is lower than the lower limit of this conditional expression (2), a high-order spherical aberration due to over-correction is generated in this air lens. In contrast, if the value exceeds the upper limit of conditional expression (2), that is disadvantageous to correcting a spherical aberration, a longitudinal chromatic aberration and a lateral chromatic aberration. When the following conditional expression (2)' is satisfied, more excellent characteristics are obtainable:

$$-0.4 < (Rnr-Rpf)/(Rnr+Rpf) < 0.2 \tag{2; and}$$

$$-0.25 < (Rnr-Rpf)/(Rnr+Rpf) < 0.1 \tag{2}', \text{where}$$

Rnr: a curvature radius of an image-side surface of the first negative lens counted from the object side in the front group, and
Rpf: a curvature radius of an object-side surface of the positive lens that is immediately after the first negative lens counted from the object side in the front group.

Further, it is desirable that front group G1 satisfies the following conditional expression (3). If the value is lower than the lower limit of this conditional expression (3), a movement amount during focusing becomes too large, and it becomes difficult to reduce the size of the system. Further, a problem that time required for focusing becomes long arises. In contrast, if the value exceeds the upper limit of conditional expression (3), a fluctuation of curvature of field due to focusing becomes large. When the following conditional expression (3)' is satisfied, more excellent characteristics are obtainable:

$$0.6 < f/f1 < 1.0 \tag{3; and}$$

$$0.7 < f/f1 < 0.95 \tag{3}', \text{where}$$

f: a focal length of an entire system, and
f1: a focal length of the front group.

It is desirable that rear group G2 satisfies the following conditional expression (4). If the value is lower than the lower limit of this conditional expression (4), a fluctuation of curvature of field due to focusing becomes large. In contrast, if the value exceeds the upper limit of conditional expression (4), the refractive power of front group G1 becomes weak. Therefore, a movement amount during focusing becomes too large, and it becomes difficult to reduce the size of the system. Further, a problem that time required for focusing becomes long arises. When the following conditional expression (4)' is satisfied, more excellent characteristics are obtainable:

$$0.1 < f/f2 < 0.5 \quad (4); \text{ and}$$

$$0.15 < f/f2 < 0.4 \quad (4)', \text{ where}$$

f: a focal length of an entire system, and
f2: a focal length of the rear group.

Further, it is desirable that positive lens L21 in rear group G2 has a convex surface facing the image side. That is advantageous to correcting astigmatism.

In the imaging lens of the present invention, the following two methods may be considered to correct secondary chromatic aberrations.

In the first method, Abbe numbers of all the negative lenses in front group G1 arranged toward the object side of aperture stop St are made greater than or equal to 35. This method corresponds to Example 1, which will be described later. This method can make the partial dispersion ratios of positive lenses and the partial dispersion ratios of negative lenses close to each other, and that is advantageous to correcting secondary chromatic aberrations. In this case, it is desirable that partial dispersion ratios of all the negative lenses in front group G1 arranged toward the object side of aperture stop St are less than or equal to 0.6.

Here, partial dispersion ratio $\theta gF$ is represented by the following equation:

$$\theta gF = (Ng - NF)/(NF - NC), \text{ where}$$

Ng: a refractive index for g-line,
NF: a refractive index for F-line, and
NC: a refractive index for C-line.

In the second method, an Abbe number of the lens closest to the object side in front group G1 is made less than or equal to 35. This method corresponds to Examples 2 through 5, which will be described later. Material having an Abbe number within this range has a relatively large partial dispersion ratio. Therefore, even if the lens is used in combination with a concave lens having a large partial dispersion ratio, it is possible to easily reduce secondary chromatic aberrations. In this case, it is desirable that a partial dispersion ratio of the lens closest to the object side in front group G1 is greater than or equal to 0.58. Here, the partial dispersion ratio is as described above.

Further, it is desirable that the imaging lens includes a cemented lens consisting of negative lens L17 with its concave surface facing the object side and positive lens L18 with its convex surface facing the image side in front group G1 in this order from the object side immediately after the stop counted from the object side. Further, it is desirable that an Abbe number of each of the lenses constituting the cemented lens is less than or equal to 25. Accordingly, it is possible to excellently correct secondary chromatic aberrations while ordinary materials are used in combination. Further, many kinds of material having small Abbe numbers have relatively high degrees of coloration. Therefore, the condition is effective also in matching the spectral characteristics of the imaging lens with those of other interchangeable lenses, such as a zoom lens, which consist of many elements.

In the imaging lens of the present invention, it is desirable to use glass as a specific material arranged most toward the object side. Alternatively, transparent ceramic may be used.

When the imaging lens of the present invention is used in tough environments, it is desirable that a multilayer coating for protection is applied. Further, an anti-reflection coating for reducing ghost light or the like during usage may be applied besides the coating for protection.

FIG. 1 and FIG. 2 illustrate examples in which optical members PP1, PP2 are arranged between the lens system and image plane Sim. Instead of arranging various filters, such as a low-pass filter and a filter that cuts a specific wavelength band, between the lens system and image plane Sim, the various filters may be arranged between lenses. Alternatively, a coating having a similar action to that of the various filters may be applied to a lens surface of one of the lenses.

Next, numerical value examples of the imaging lens of the present invention will be described. Numerical values in the following tables 1 through 11 and aberration diagrams illustrated in FIGS. 7 through 11 are normalized so that the focal length of the entire system when the lens system is focused on an object at infinity is 1.0.

First, an imaging lens in Example 1 will be described. FIG. 1 is a cross section illustrating the lens configuration of the imaging lens in Example 1. Optical members PP1, PP2 are also illustrated in FIG. 1 and FIGS. 3 through 6 corresponding to Examples 2 through 5, which will be described later. Further, the left side is the object side, and the right side is the image side. Illustrated aperture stop St does not necessarily represent the size nor the shape of aperture stop, but a position on optical axis Z.

The imaging lens in Example 1 consists of front group G1 having positive refractive power as a whole and rear group G2 having positive refractive power as a whole in this order from an object side. Further, front group G1 consists of plano-convex lens L11 with its convex surface facing the object side, two positive meniscus lenses L12, L13, each of which has its convex surface facing the object side, negative meniscus lens L14 with its concave surface facing the image side, a cemented lens consisting of positive meniscus lens L15 with its convex surface facing the object side and negative meniscus lens L16 with its concave surface facing the image side, aperture stop St, a cemented lens consisting of negative meniscus lens L17 with its concave surface facing the object side and positive meniscus lens L18 with its convex surface facing the image side, and biconvex lens L19 in this order from the object side. Further, rear group G2 consists of biconvex lens L21 and biconcave lens L22 in this order from the object side.

Lens L11, which is arranged closest to the object side in front group G1, is a plano-convex lens with its convex surface facing the object side. Therefore, it is possible to relatively suppress a spherical aberration.

Lens L12, which is the second lens from the object side, and lens L13, which is the third lens from the object side, are positive meniscus lenses, each of which has its convex surface facing the object side. That is advantageous to correcting a spherical aberration and astigmatism. Here, lens L12, which is the second lens from the object side, uses anomalous dispersion material having an Abbe number of 81.54 and θgF of 0.53748. That is effective in correcting secondary chromatic aberrations.

Negative lens L14, which follows lenses L12, L13, is a negative meniscus lens with its concave surface facing the image side. That is advantageous to correcting astigmatism and preventing a difference in spherical aberrations according to wavelengths. This lens uses anomalous dispersion material having an Abbe number of 44.27 and θgF of 0.5634.

In a cemented lens that follows lens L14, negative lens L16 uses also the same anomalous dispersion material as the above-mentioned anomalous dispersion material of lens L14. When the material is used in combination with the material of the second lens L12, that is effective in correcting secondary chromatic aberrations.

A cemented lens that follows lens L16 with aperture stop St between lens L16 and the cemented lens consists of lenses of high dispersion material cemented together, and θgF of positive lens L18 is slightly larger. Therefore, that is effective in correcting secondary chromatic aberrations while lenses of ordinary glass are used in combination. Further, since both of the lenses of this cemented lens use material having high degrees of coloration, that is effective also in matching the spectral characteristics of the imaging lens with those of other interchangeable lenses, such as a zoom lens, which consist of many elements.

Biconvex lens L19, which follows lens L18, shares refractive power with positive lens L18, which is immediately before lens L19. That is effective in reducing a spherical aberration.

The material of biconvex lens L21 in rear group G2 has a high refractive index. That is effective in improving Petzval sum, and thereby improving curvature of field. The material of biconcave lens L22 has a low refractive index, compared with biconvex lens L21, which is immediately before lens L22. That is effective in improving Petzval sum, and thereby improving curvature of field.

Focusing is performed by extending front group G1. Therefore, it is possible to suppress a fluctuation of curvature of field due to focusing.

Table 1 shows basic lens data of the imaging lens in Example 1, and Table 2 shows data about specification of the imaging lens in Example 1.

Next, the meanings of signs in the tables will be described by using Example 1 as an example. The meanings of signs in Examples 2 through 5 are basically similar to Example 1.

In the lens data of Table 1, a column of Si shows the surface number of i-th surface (i=1, 2, 3 . . . ) that sequentially increases toward the image side when a most object-side surface of composition elements is the first surface. A column of Ri shows the curvature radius of the i-th surface, and a column of Di shows a surface distance on optical axis Z between an i-th surface and an (i+1)th surface. Further, a column of Ndi shows a refractive index for d-line (wavelength is 587.6 nm) of a medium between the i-th surface and the (i+1)th surface. A column of vdj shows an Abbe number of a j-th optical element (j=1, 2, 3 . . . ) for d-line when a most object-side optical element is the first optical element and j sequentially increases toward the image side. A column of θgFj shows a partial dispersion ratio of the j-th optical element (j=1, 2, 3 . . . ) when a most object-side optical element is the first optical element and j sequentially increases toward the image side.

Here, the sign of a curvature radius is positive when a surface shape is convex toward the object side, and negative when a surface shape is convex toward the image side. The basic lens data show also aperture stop St and optical member PP. In the column of surface numbers, the term "(STOP)" is written together with the surface number of a surface corresponding to aperture stop St.

Data about specification in Table 2 show focal length f′, F-number FNo., and full angle 2ω of view.

In the basic lens data and the data about specification, degrees are used as the unit of angles. However, no unit is present for the other values because the values are normalized.

TABLE 1

EXAMPLE 1 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 1 | 1.494234 | 0.0462 | 1.51680 | 64.20 | 0.53430 |
| 2 | ∞ | 0.0041 | | | |
| 3 | 0.364845 | 0.1180 | 1.49700 | 81.54 | 0.53748 |
| 4 | 2.282456 | 0.0182 | | | |
| 5 | 0.351479 | 0.0457 | 1.51680 | 64.20 | 0.53430 |
| 6 | 0.478681 | 0.0364 | | | |
| 7 | 2.081053 | 0.0209 | 1.61340 | 44.27 | 0.56340 |
| 8 | 0.223391 | 0.0158 | | | |
| 9 | 0.263812 | 0.0696 | 1.61800 | 63.33 | 0.54414 |
| 10 | 1.160473 | 0.0201 | 1.61340 | 44.27 | 0.56340 |
| 11 | 0.239150 | 0.0690 | | | |
| 12(STOP) | ∞ | 0.1302 | | | |
| 13 | −0.259672 | 0.0152 | 1.84661 | 23.78 | 0.62072 |
| 14 | −1.510917 | 0.0506 | 1.92286 | 20.88 | 0.63900 |
| 15 | −0.397829 | 0.0034 | | | |
| 16 | 1.328409 | 0.0546 | 1.48749 | 70.23 | 0.53007 |
| 17 | −0.394975 | 0.0804 | | | |
| 18 | 1.072838 | 0.0352 | 1.83481 | 42.73 | 0.56486 |
| 19 | −1.487902 | 0.0204 | | | |
| 20 | −1.137359 | 0.0201 | 1.63980 | 34.46 | 0.59233 |
| 21 | 1.137358 | 0.2672 | | | |
| 22 | ∞ | 0.0101 | 1.51680 | 64.20 | 0.53430 |
| 23 | ∞ | 0.0020 | | | |
| 24 | ∞ | 0.0131 | 1.51680 | 64.20 | 0.53430 |
| 25 | ∞ | 0.0586 | | | |

TABLE 2

| EXAMPLE 1 • SPECIFICATION (d-LINE) | |
|---|---|
| ZOOM MAGNIFICATION RATIO | 1.0 |
| f | 1.00 |
| FNo. | 1.94 |
| 2ω[°] | 18.6 |

FIG. 7, Sections A through E are aberration diagrams of the imaging lens in Example 1. FIG. 7, Sections A through E illustrate a spherical aberration, sine condition, astigmatism, distortion and a lateral chromatic aberration, respectively.

The aberration diagrams of a spherical aberration, sine condition, astigmatism and distortion illustrate aberrations when d-line (wavelength is 587.6 nm) is a reference wavelength. The aberration diagram of the spherical aberration illustrates aberrations for d-line (wavelength is 587.6 nm), C-line (wavelength is 656.3 nm), F-line (wavelength is 486.1 nm) and g-line (wavelength is 435.8 nm) by a solid line, a long broken line, a short broken line and a dotted line, respectively. The aberration diagram of the astigmatism illustrates aberrations for a sagittal direction and a tangential direction by a solid line and a broken line, respectively. The aberration diagram of the lateral chromatic aberration illustrates aberrations for C-line (wavelength is 656.3 nm), F-line (wavelength is 486.1 nm) and g-line (wavelength is 435.8 nm) by a long broken line, a short broken line and a dotted line, respectively. In the aberration diagram of the spherical aberration and the aberration diagram of sine condition, Fno. means an F-number. In the other diagrams, ω represents a half angle of view.

Next, an imaging lens in Example 2 will be described. FIG. 3 is a cross section illustrating the lens configuration of the imaging lens in Example 2.

The imaging lens in Example 2 consists of front group G1 having positive refractive power as a whole and rear group G2 having positive refractive power as a whole in this order from an object side. Further, front group G1 consists of biconvex lens L11, two positive meniscus lenses L12, L13, each of which has its convex surface facing the object side, negative meniscus lens L14 with its concave surface facing the image side, a cemented lens consisting of biconvex lens L15 and biconcave lens L16, aperture stop St, a cemented lens consisting of biconcave lens L17 and biconvex lens L18, and biconvex lens L19 in this order from the object side. Further, rear group G2 consists of a cemented lens of biconvex lens L21 and biconcave lens L22 in this order from the object side.

Lens L11 closest to the object side differs from Example 1, and lens L11 is a biconvex lens. However, since a surface having the smaller absolute value of a curvature radius faces the object side, and the absolute value of a curvature radius of the image-side surface is relatively large, compared with that of the object side, it is possible to relatively suppress generation of a spherical aberration. When this lens uses high dispersion material having an Abbe number of 23.83 and θgF of 0.61603, that is effective in correcting secondary chromatic aberrations.

Further, lens L12, which is the second lens from the object side, and lens L13, which is the third lens from the object side, are positive meniscus lenses, each of which has its convex surfaces facing the object side. That is advantageous to correcting a spherical aberration and astigmatism.

Lens L14, which follows lenses L12, L13, is a negative meniscus lens with its concave surface facing the image side. That is advantageous to correcting astigmatism and preventing a difference in spherical aberrations according to wavelengths.

A cemented lens that follows lens L14 uses anomalous dispersion material having an Abbe number of 67.74 and θgF of 0.54426, as the material of convex lens L15. That is effective in correcting secondary chromatic aberrations.

A cemented lens that follows the aforementioned cemented lens with aperture stop St between the cemented lenses consists of lenses of high dispersion material cemented together, and θgF of positive lens L18 is slightly larger. Therefore, that is effective in correcting secondary chromatic aberrations while lenses of ordinary glass are used in combination. Further, since both of the lenses in this cemented lens use material having high degrees of coloration, that is effective also in matching the spectral characteristics of the imaging lens with those of other interchangeable lenses, such as a zoom lens, which consist of many elements.

Biconvex lens L19, which follows lens L18, shares refractive power with positive lens L18, which is immediately before lens L19. That is effective in reducing a spherical aberration.

The cemented lens in rear group G2 is effective in correcting a longitudinal chromatic aberration.

Focusing is performed by extending front group G1. Therefore, it is possible to suppress a fluctuation of curvature of field due to focusing.

Figure 8:
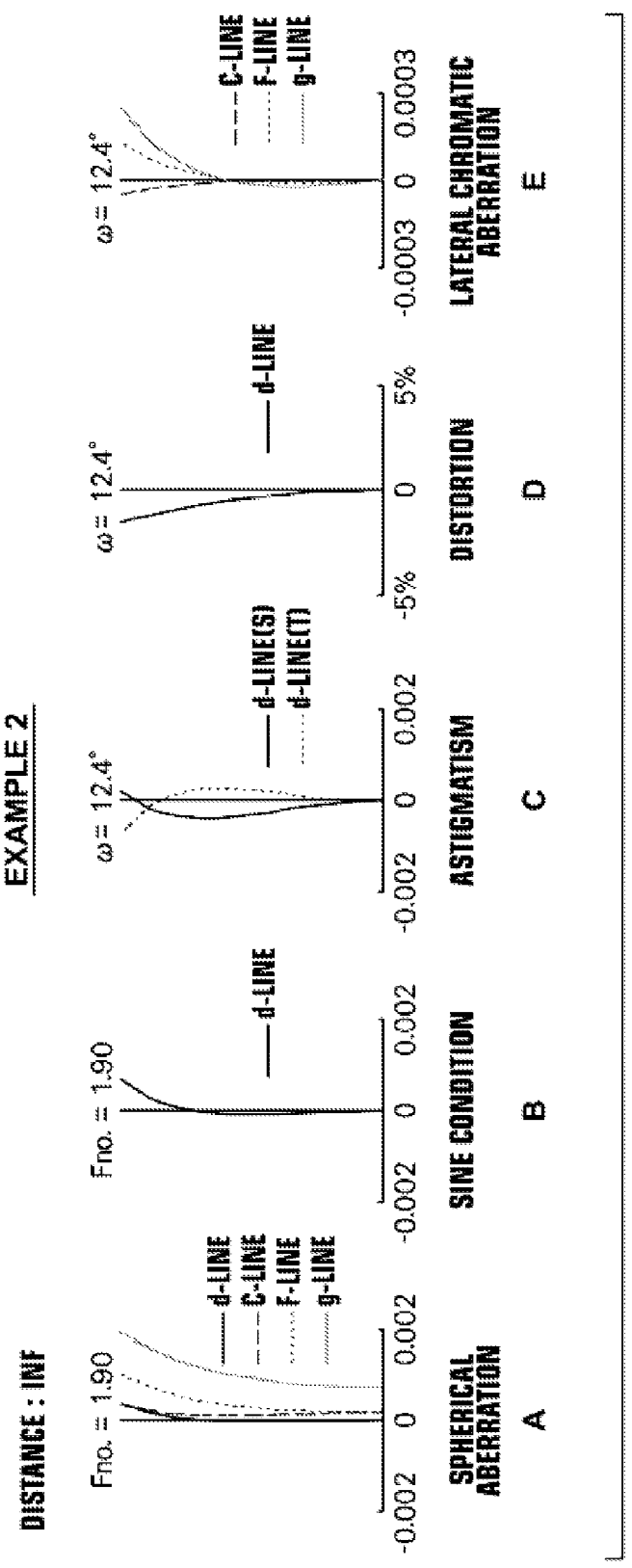
FIG. 8, Sections A through E are aberration diagrams of the imaging lens in Example 2 of the present invention.

Table 3 shows basic lens data of the imaging lens in Example 2, and Table 4 shows data about specification of the imaging lens in Example 2. FIG. 8, Sections A through E are aberration diagrams of the imaging lens in Example 2.

TABLE 3

| EXAMPLE 2 • LENS DATA | | | | | |
|---|---|---|---|---|---|
| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
| 1 | 2.510284 | 0.0471 | 1.84666 | 23.83 | 0.61603 |
| 2 | −22.964618 | 0.0013 | | | |
| 3 | 0.521578 | 0.1157 | 1.59522 | 67.74 | 0.54426 |
| 4 | 2.125656 | 0.0021 | | | |
| 5 | 0.495629 | 0.1146 | 1.48749 | 70.23 | 0.53007 |
| 6 | 0.547421 | 0.0359 | | | |
| 7 | 1.823497 | 0.0160 | 1.71736 | 29.52 | 0.60483 |
| 8 | 0.277157 | 0.0571 | | | |
| 9 | 0.287194 | 0.0848 | 1.59522 | 67.74 | 0.54426 |
| 10 | −1.507941 | 0.0140 | 1.67300 | 38.15 | 0.57545 |

TABLE 3-continued

EXAMPLE 2 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 11 | 0.287233 | 0.0846 | | | |
| 12(STOP) | ∞ | 0.0707 | | | |
| 13 | −0.356522 | 0.0141 | 1.84666 | 23.83 | 0.61603 |
| 14 | 1.517753 | 0.0547 | 1.92286 | 20.88 | 0.63900 |
| 15 | −0.486478 | 0.1311 | | | |
| 16 | 2.593858 | 0.0755 | 1.77250 | 49.60 | 0.55212 |
| 17 | −0.666995 | 0.0137 | | | |
| 18 | 0.935655 | 0.1045 | 1.61800 | 63.33 | 0.54414 |
| 19 | −0.471395 | 0.0201 | 1.62004 | 36.26 | 0.58800 |
| 20 | 1.812877 | 0.3918 | | | |
| 21 | ∞ | 0.0133 | 1.51680 | 64.20 | 0.53430 |
| 22 | ∞ | 0.0027 | | | |
| 23 | ∞ | 0.0173 | 1.51680 | 64.20 | 0.53430 |
| 24 | ∞ | 0.0768 | | | |

TABLE 4

EXAMPLE 2 • SPECIFICATION (d-LINE)

| ZOOM MAGNIFICATION RATIO | 1.0 |
|---|---|
| f | 1.00 |
| FNo. | 1.90 |
| 2ω[°] | 24.8 |

Next, an imaging lens in Example 3 will be described. FIG. 4 is a cross section illustrating the lens configuration of the imaging lens in Example 3.

The imaging lens in Example 3 consists of front group G1 having positive refractive power as a whole and rear group G2 having positive refractive power as a whole in this order from an object side. Further, front group G1 consists of three positive meniscus lenses L11, L12, L13, each of which has its convex surface facing the object side, negative meniscus lens L14 with its concave surface facing the image side, a cemented lens consisting of biconvex lens L15 and biconcave lens L16, aperture stop St, a cemented lens consisting of negative meniscus lens L17 with its concave surface facing the object side and positive meniscus lens L18 with its convex surface facing the image side, and biconvex lens L19 in this order from the object side. Further, rear group G2 consists of a cemented lens of biconvex lens L21 and biconcave lens L22 in this order from the object side.

Lens L11, which is closest to the object side, uses high dispersion material having an Abbe number of 23.83 and θgF of 0.61603. That is effective in correcting secondary chromatic aberrations.

Further, lens L11, which is the first lens from the object side, through lens L13, which is the third lens from the object side, are positive meniscus lenses, each of which has a convex surface facing the object side. That is advantageous to correcting a spherical aberration and astigmatism.

Negative lens L14, which follows lenses L11 through L13, is a negative meniscus lens with its concave surface facing the image side. That is advantageous to correcting astigmatism and preventing a difference in spherical aberrations according to wavelengths.

A cemented lens that follows lens L14 is effective in correcting a longitudinal chromatic aberration.

A cemented lens that follows the aforementioned cemented lens with aperture stop St between the cemented lenses consists of lenses of high dispersion material cemented together, and θgF of positive lens L17 is slightly larger. Therefore, that is effective in correcting secondary chromatic aberrations while lenses of ordinary glass are used in combination. Further, since both of the lenses of this cemented lens use material having high degrees of coloration, that is effective also in matching the spectral characteristics of the imaging lens with those of other interchangeable lenses, such as a zoom lens, which consist of many elements.

Biconvex lens L19, which follows lens L18, shares refractive power with positive lens L18, which is immediately before lens L19. That is effective in reducing a spherical aberration.

The cemented lens in rear group G2 is effective in correcting a longitudinal chromatic aberration.

Focusing is performed by extending front group G1. Therefore, it is possible to suppress a fluctuation of curvature of field due to focusing.

Figure 9:
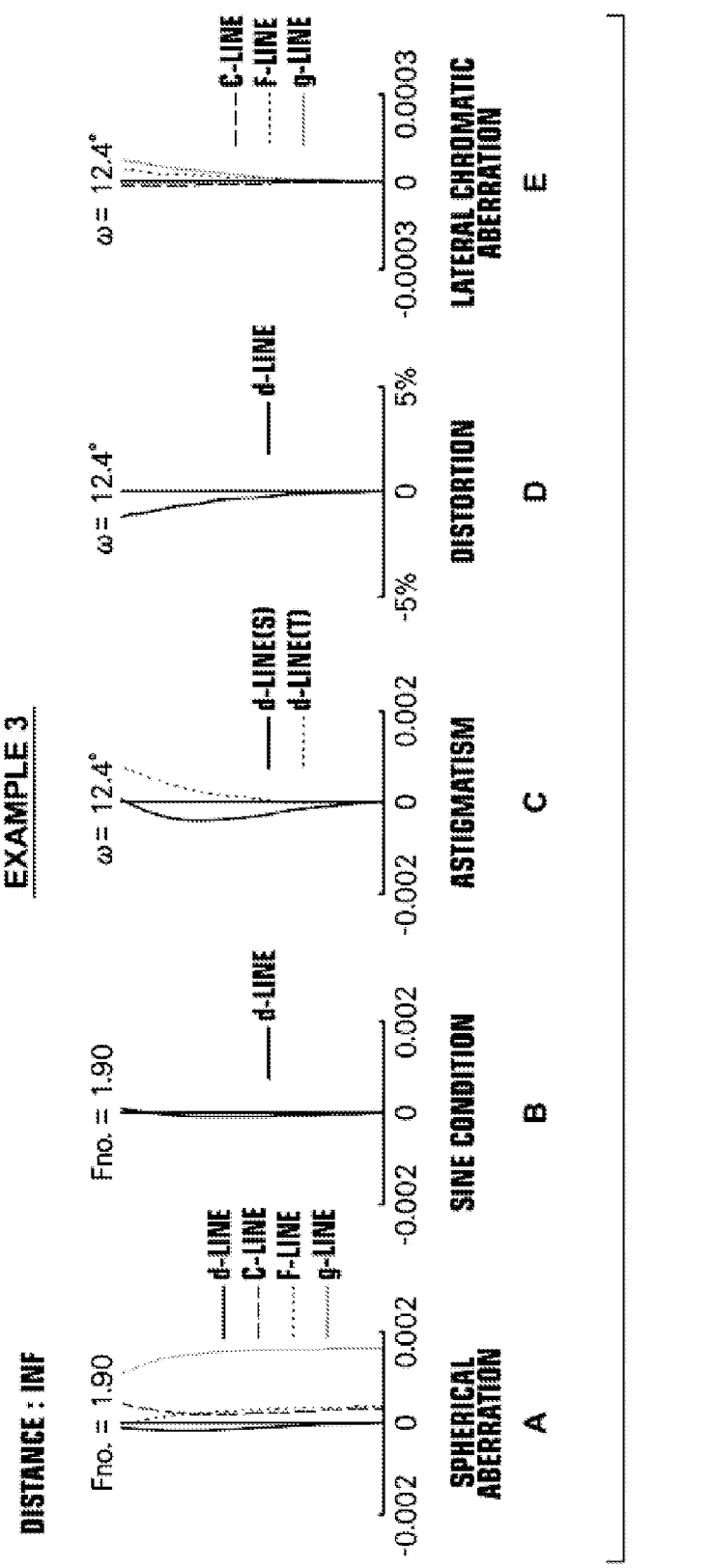
FIG. 9, Sections A through E are aberration diagrams of the imaging lens in Example 3 of the present invention.

Table 5 shows basic lens data of the imaging lens in Example 3, and Table 6 shows data about specification of the imaging lens in Example 3. FIG. 9, Sections A through E are aberration diagrams of the imaging lens in Example 3.

TABLE 5

EXAMPLE 3 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 1 | 0.924482 | 0.0816 | 1.84666 | 23.83 | 0.61603 |
| 2 | 2.650829 | 0.0490 | | | |
| 3 | 0.849021 | 0.0660 | 1.59522 | 67.74 | 0.54426 |

TABLE 5-continued

EXAMPLE 3 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 4 | 1.944972 | 0.0013 | | | |
| 5 | 0.567950 | 0.0831 | 1.59522 | 67.74 | 0.54426 |
| 6 | 0.744087 | 0.0350 | | | |
| 7 | 3.320346 | 0.0386 | 1.76182 | 26.52 | 0.61361 |
| 8 | 0.299526 | 0.0182 | | | |
| 9 | 0.321067 | 0.1062 | 1.77250 | 49.60 | 0.55212 |
| 10 | −0.636875 | 0.0140 | 1.67300 | 38.15 | 0.57545 |
| 11 | 0.313129 | 0.0840 | | | |
| 12(STOP) | ∞ | 0.0855 | | | |
| 13 | −0.302898 | 0.0141 | 1.84666 | 23.83 | 0.61603 |
| 14 | −1.014509 | 0.0653 | 1.92286 | 20.88 | 0.63900 |
| 15 | −0.433587 | 0.0703 | | | |
| 16 | 3.577100 | 0.0845 | 1.77250 | 49.60 | 0.55212 |
| 17 | −0.615896 | 0.0406 | | | |
| 18 | 1.628171 | 0.0812 | 1.59522 | 67.74 | 0.54426 |
| 19 | −0.597712 | 0.0193 | 1.58144 | 40.75 | 0.57757 |
| 20 | 5.179977 | 0.4532 | | | |
| 21 | ∞ | 0.0133 | 1.51680 | 64.20 | 0.53430 |
| 22 | ∞ | 0.0027 | | | |
| 23 | ∞ | 0.0173 | 1.51680 | 64.20 | 0.53430 |
| 24 | ∞ | 0.0784 | | | |

TABLE 6

EXAMPLE 3 • SPECIFICATION (d-LINE)

| | |
|---|---|
| ZOOM MAGNIFICATION RATIO | 1.0 |
| f | 1.00 |
| FNo. | 1.91 |
| 2ω[°] | 24.8 |

Next, an imaging lens in Example 4 will be described. FIG. 5 is a cross section illustrating the lens configuration of the imaging lens in Example 4.

The imaging lens in Example 4 consists of front group G1 having positive refractive power as a whole and rear group G2 having positive refractive power as a whole in this order from an object side. Further, front group G1 consists of biconvex lens L11, positive meniscus lens L12 with its convex surface facing the object side, negative meniscus lens L13 with its concave surface facing the image side, a cemented lens consisting of biconvex lens L14 and biconcave lens L15, aperture stop St, a cemented lens consisting of negative meniscus lens L16 with its concave surface facing the object side and positive meniscus lens L17 with its convex surface facing the image side, and biconvex lens L18 in this order from the object side. Further, rear group G2 consists of a cemented lens of biconvex lens L21 and negative meniscus lens L22 with its concave surface facing the object side in this order from the object side.

Lens L11 closest to the object side differs from Example 1, and lens L11 is a biconvex lens. However, since a surface having the smaller absolute value of a curvature radius faces the object side, and the absolute value of a curvature radius of the image-side surface is relatively large, compared with that of the object side, it is possible to relatively suppress generation of a spherical aberration. When this lens uses high dispersion material having an Abbe number of 32.25 and θgF of 0.59388, that is effective in correcting secondary chromatic aberrations.

Lens L12, which is the second lens from the object side, is a positive meniscus lens with its convex surface facing the object side. That is advantageous to correcting a spherical aberration and astigmatism.

Negative lens L13, which follows lens L12, is a negative meniscus lens with its concave surface facing the image side. That is advantageous to correcting astigmatism and preventing a difference in spherical aberrations according to wavelengths.

A cemented lens that follows lens L13 uses anomalous dispersion material having an Abbe number of 67.74 and θgF of 0.54426, as the material of convex lens L14. That is effective in correcting secondary chromatic aberrations.

A cemented lens that follows the aforementioned cemented lens with aperture stop St between the cemented lenses consists of lenses of high dispersion material cemented together, and θgF of positive lens L17 is slightly larger. Therefore, that is effective in correcting secondary chromatic aberrations while lenses of ordinary glass are used in combination. Further, since both of the lenses of this cemented lens use material having high degrees of coloration, that is effective also in matching the spectral characteristics of the imaging lens with those of other interchangeable lenses, such as a zoom lens, which consist of many elements.

Biconvex lens L18, which follows lens L17, shares refractive power with positive lens L17, which is immediately before lens L18. That is effective in reducing a spherical aberration.

The cemented lens in rear group G2 uses anomalous dispersion material having an Abbe number of 81.54 and θgF of 0.53748, as the material of biconvex lens L21. That is effective in correcting a longitudinal chromatic aberration and secondary chromatic aberrations.

Focusing is performed by extending front group G1. Therefore, it is possible to suppress a fluctuation of curvature of field due to focusing.

Figure 10:
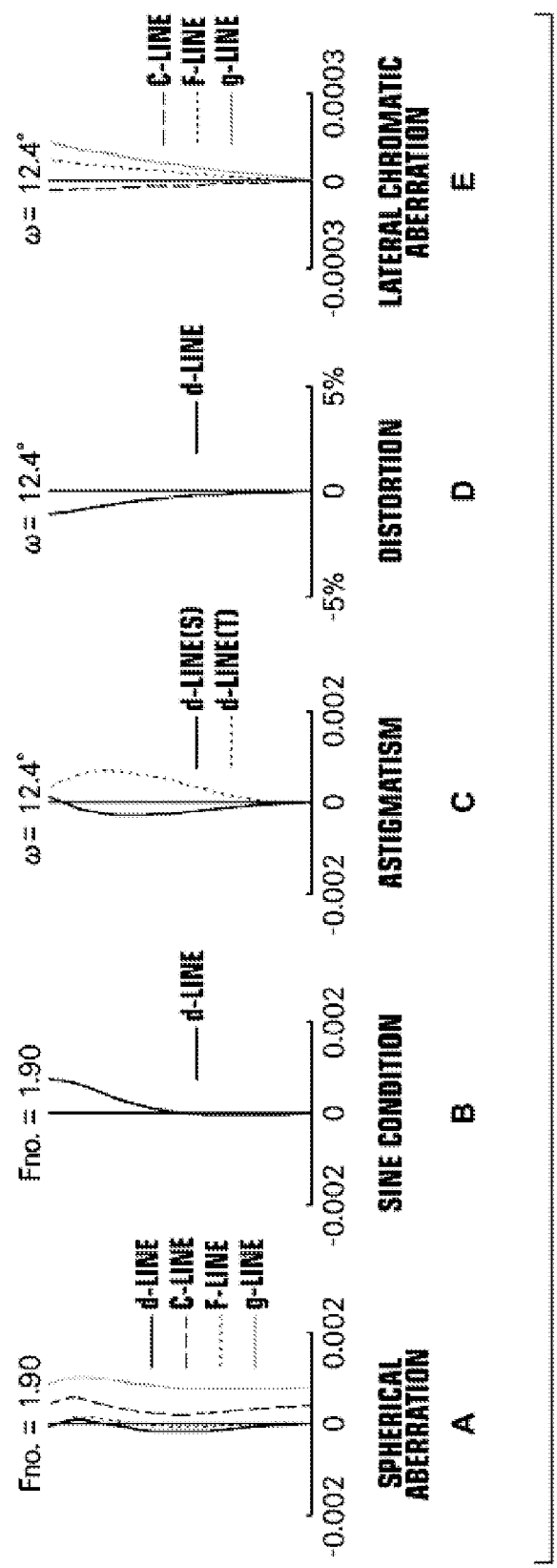
FIG. 10, Sections A through E are aberration diagrams of the imaging lens in Example 4 of the present invention.

Table 7 shows basic lens data of the imaging lens in Example 4, and Table 8 shows data about specification of the imaging lens in Example 4. FIG. 10, Sections A through E are aberration diagrams of the imaging lens in Example 4.

TABLE 7

EXAMPLE 4 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 1 | 1.334880 | 0.0730 | 1.77751 | 32.25 | 0.59388 |
| 2 | −48.466927 | 0.0216 | | | |
| 3 | 0.584839 | 0.0771 | 1.83500 | 39.76 | 0.57203 |
| 4 | 0.931558 | 0.1110 | | | |
| 5 | 2.436491 | 0.0332 | 1.58001 | 40.00 | 0.57659 |
| 6 | 0.273881 | 0.0316 | | | |
| 7 | 0.289272 | 0.1164 | 1.59522 | 67.74 | 0.54426 |
| 8 | −0.688525 | 0.0159 | 1.71691 | 29.15 | 0.60046 |
| 9 | 0.317666 | 0.0853 | | | |
| 10(STOP) | ∞ | 0.1057 | | | |
| 11 | −0.267370 | 0.0180 | 1.84661 | 23.78 | 0.62072 |
| 12 | −0.592881 | 0.0478 | 1.92286 | 20.88 | 0.63900 |
| 13 | −0.348817 | 0.0013 | | | |
| 14 | 3.009404 | 0.0782 | 1.72262 | 55.37 | 0.54271 |
| 15 | −0.511751 | 0.0755 | | | |
| 16 | 2.169820 | 0.0744 | 1.49700 | 81.54 | 0.53748 |
| 17 | −1.032234 | 0.0265 | 1.58144 | 40.75 | 0.57757 |
| 18 | −5.094944 | 0.5082 | | | |
| 19 | ∞ | 0.0133 | 1.51680 | 64.20 | 0.53430 |
| 20 | ∞ | 0.0027 | | | |
| 21 | ∞ | 0.0172 | 1.51680 | 64.20 | 0.53430 |
| 22 | ∞ | 0.0784 | | | |

TABLE 8

EXAMPLE 4 • SPECIFICATION (d-LINE)

| ZOOM MAGNIFICATION RATIO | 1.0 |
|---|---|
| f | 1.00 |
| FNo. | 1.93 |
| 2ω[°] | 24.8 |

Next, an imaging lens in Example 5 will be described. FIG. 6 is a cross section illustrating the lens configuration of the imaging lens in Example 5.

The imaging lens in Example 5 has a widest angle of view among the five examples of the present invention. Example 5 has been formed by paying attention to removal of astigmatism, compared with the other examples.

The imaging lens of this example consists of front group G1 having positive refractive power as a whole and rear group G2 having positive refractive power as a whole in this order from an object side. Further, front group G1 consists of two positive meniscus lenses L11, L12, each of which has its convex surface facing the object side, negative meniscus lens L13 with its concave surface facing the image side, positive meniscus lens L14 with its convex surface facing the object side, biconcave lens L15, aperture stop St, a cemented lens consisting of biconcave lens L16 and biconvex lens L17, and positive meniscus lens L18 with its convex surface facing the image side in this order from the object side. Further, rear group G2 consists of a cemented lens of biconvex lens L21 and negative meniscus lens L22 with its concave surface facing the object side in this order from the object side.

Two lenses L11, L12 closest to the object side are positive meniscus lenses, each of which has its convex surface facing the object side. That is advantageous to correcting a spherical aberration and astigmatism.

Negative lens L13, which follows lenses L11, L12, is a negative meniscus lens with its concave surface facing the image side. That is advantageous to correcting astigmatism and preventing a difference in spherical aberrations according to wavelengths. Further, negative lens L13 uses material having an Abbe number of 36.26 and θgF of 0.58800, which is a relatively small partial dispersion ratio, while the material is an ordinary material. That is effective in correcting secondary chromatic aberrations.

Lens L14, which follows lens L13, is a positive meniscus lens with its convex surface facing the object side. That is advantageous to correcting a spherical aberration and astigmatism.

Biconcave lens L15, which follows lens L14, uses material having an Abbe number of 35.31 and θgF of 0.59336, which is a relatively small partial dispersion ratio, while the material is an ordinary material. That is effective in correcting secondary chromatic aberrations.

A cemented lens that follows lens L15 with aperture stop St between lens L15 and the cemented lens uses relatively low dispersion material having an Abbe number of 58.90 and θgF of 0.54567, as the material of biconcave lens L16, and anomalous dispersion material having an Abbe number of 81.54 and θgF of 0.53748, as the material of biconvex lens L17. That is effective in correcting a longitudinal chromatic aberration and secondary chromatic aberrations.

Positive meniscus lens L18, which follows lens L17, is effective in correcting astigmatism.

The cemented lens in rear group G2 is effective in correcting a longitudinal chromatic aberration.

Focusing is performed by extending front group G1. Therefore, it is possible to suppress a fluctuation of curvature of field due to focusing.

Figure 11:
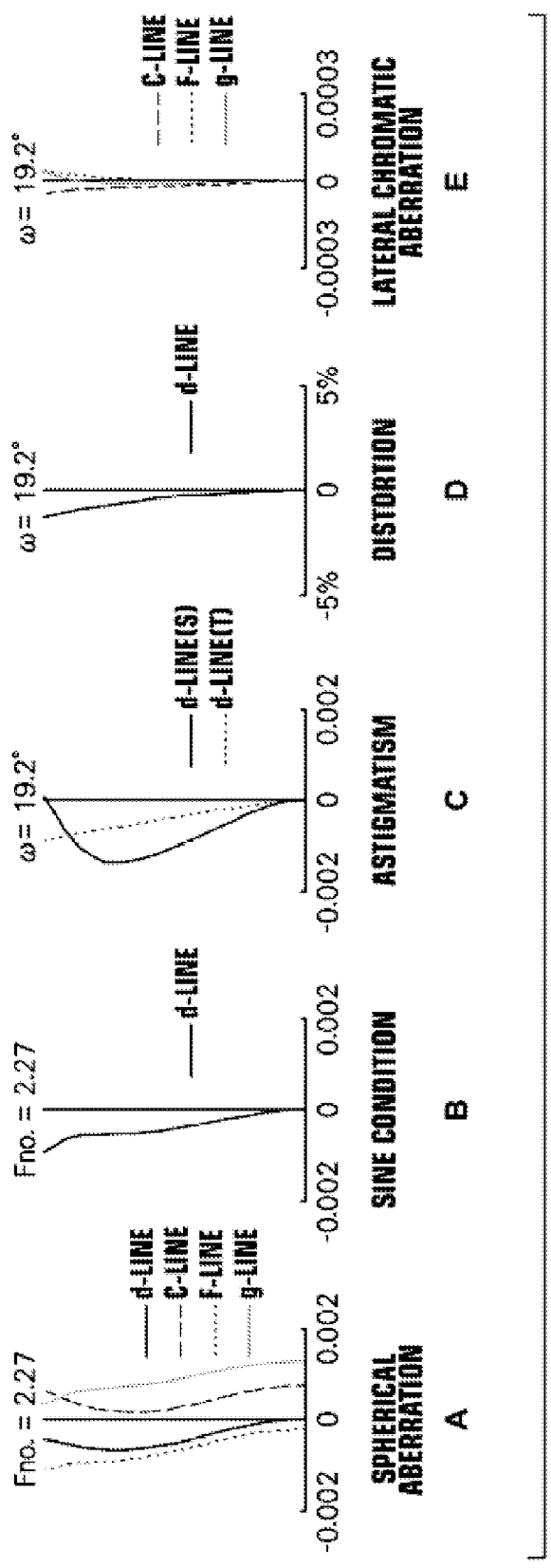
FIG. 11, Sections A through E are aberration diagrams of the imaging lens in Example 5 of the present invention.

Table 9 shows basic lens data of the imaging lens in Example 5, and Table 10 shows data about specification of the imaging lens in Example 5. FIG. 11, Sections A through E are aberration diagrams of the imaging lens in Example 5.

TABLE 9

EXAMPLE 5 • LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ gFj (PARTIAL DISPERSION RATIO) |
|---|---|---|---|---|---|
| 1 | 0.732369 | 0.0439 | 1.62299 | 58.16 | 0.54589 |
| 2 | 1.251652 | 0.0020 | | | |
| 3 | 0.325418 | 0.1015 | 1.56384 | 60.67 | 0.54030 |
| 4 | 2.193252 | 0.0074 | | | |
| 5 | 0.975494 | 0.0187 | 1.62004 | 36.26 | 0.58800 |
| 6 | 0.253837 | 0.0243 | | | |
| 7 | 0.362121 | 0.0494 | 1.80100 | 34.97 | 0.58642 |
| 8 | 1.342254 | 0.0108 | | | |
| 9 | −38.769344 | 0.0159 | 1.59270 | 35.31 | 0.59336 |
| 10 | 0.326313 | 0.1143 | | | |
| 11(STOP) | ∞ | 0.1089 | | | |
| 12 | −0.230383 | 0.0254 | 1.51823 | 58.90 | 0.54567 |
| 13 | 1.038439 | 0.0821 | 1.49700 | 81.61 | 0.53887 |
| 14 | −0.365134 | 0.0020 | | | |
| 15 | −70.417915 | 0.0796 | 1.65160 | 58.55 | 0.54267 |
| 16 | −0.498355 | 0.0198 | | | |
| 17 | 20.274101 | 0.0423 | 1.83481 | 42.73 | 0.56486 |
| 18 | −1.139294 | 0.0200 | 1.80518 | 25.42 | 0.61616 |
| 19 | −4.714885 | 0.6045 | | | |
| 20 | ∞ | 0.0076 | 1.52310 | 54.51 | 0.56255 |
| 21 | ∞ | 0.0100 | 1.53740 | 61.72 | 0.54315 |
| 22 | ∞ | 0.0000 | | | |

TABLE 10

EXAMPLE 5 • SPECIFICATION (d-LINE)

| ZOOM MAGNIFICATION RATIO | 1.0 |
|---|---|
| f | 1.00 |
| FNo. | 2.27 |
| 2ω[°] | 38.4 |

Table 11 shows values corresponding to conditional expressions (1) through (4) about the imaging lenses in Examples 1 through 5. In all of the examples, d-line is a reference wavelength. The following Table 11 shows values at this reference wavelength.

TABLE 11

| NUMBER OF EXPRESSION | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (1) | f/f1n | −2.45 | −2.18 | −2.29 | −1.86 | −1.79 |
| (2) | (Rnr − Rpf)/(Rnr + Rpf) | −0.08 | −0.02 | −0.03 | −0.03 | −0.18 |
| (3) | f/f1 | 0.86 | 0.79 | 0.82 | 0.83 | 0.85 |
| (4) | f/f2 | 0.26 | 0.33 | 0.28 | 0.26 | 0.24 |

As the data show, all the imaging lenses in Examples 1 through 5 satisfy conditional expressions (1) through (4). It is recognizable that F-number is 1.90 through 2.27, which means the imaging lenses are fast lenses, and that various aberrations are excellently corrected in the imaging lenses.

Figure 12:
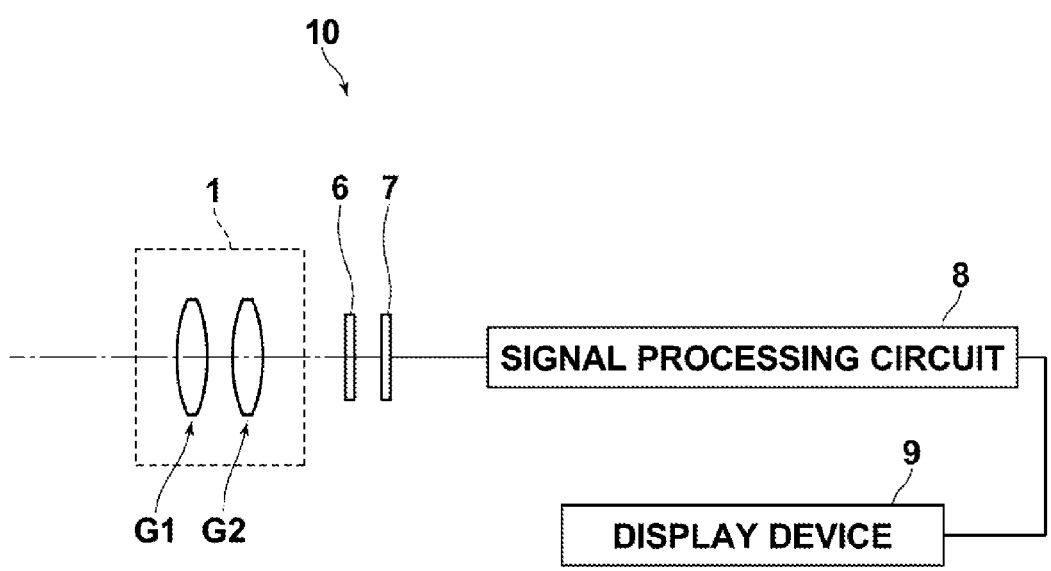
FIG. 12 is a schematic diagram illustrating the configuration of an imaging apparatus according to an embodiment of the present invention.

Next, an imaging apparatus according to an embodiment of the present invention will be described. FIG. 12 is a schematic diagram illustrating the configuration of an imaging apparatus using an imaging lens according to an embodiment of the present invention, as an example of an imaging apparatus according to an embodiment of the present invention. In FIG. 12, each lens group is schematically illustrated. This imaging apparatus is, for example, a video camera, an electronic still camera or the like using a solid-state imaging device, such as a CCD and a CMOS, as a recording medium.

An imaging apparatus 10, such as a video camera, illustrated in FIG. 12 includes an imaging lens 1, a filter 6, an imaging device 7 and a signal processing circuit 8. The filter 6 is arranged toward the image side of the imaging lens 1, and has a function as a low-pass filter or the like, and the imaging device 7 is arranged toward the image side of the filter 6. The imaging device 7 converts an optical image formed by the imaging lens 1 into electrical signals. For example, a CCD (Charge Coupled Device), a CMOS (Complementary Metal Oxide Semiconductor) and the like may be used as the imaging device 7. The imaging device 7 is arranged in such a manner that an imaging surface of the imaging device 7 and the image plane of the imaging lens 1 match with each other.

An image imaged by the imaging lens 1 is formed on an imaging surface of the imaging device 7. Signals about the image are output from the imaging device 7, and operation processing is performed on the output signals at the signal processing circuit 8. Further, an image is displayed on a display device 9.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

What is claimed is:

1. An imaging lens consisting of:
a front group having positive refractive power as a whole; and
a rear group in this order from an object side,
wherein the front group consists of two or three positive lenses, a negative lens with its concave surface facing an image side, a positive lens with its convex surface facing the object side, a negative lens with its concave surface facing the image side, a stop, a negative lens with its concave surface facing the object side and a plurality of positive lenses in this order from the object side,
wherein the front group satisfies the following conditional expression:

$$0.6 < f/f1 < 1.0 \quad (3), \text{ where}$$

f: a focal length of an entire system, and
f1: a focal length of the front group and
wherein the rear group has positive refractive power and consists of a positive lens and a negative lens in this order from the object side.

2. The imaging lens, as defined in claim 1, wherein focusing is performed by moving at least the front group in the direction of an optical axis.

3. The imaging lens, as defined in claim 1, wherein each of the two or three positive lenses closest to the object side in the front group has a convex surface facing the object side.

4. The imaging lens, as defined in claim 1, wherein the number of the plurality of positive lenses in the front group arranged toward the image side of the stop is two.

5. The imaging lens, as defined in claim 1, wherein the number of the plurality of positive lenses in the front group arranged toward the image side of the stop is two, and each of the two positive lenses has its convex surface facing the image side.

6. The imaging lens, as defined in claim 1, wherein a first negative lens counted from the object side in the front group satisfies the following conditional expression:

$$-4 < f/f1n < -1 \quad (1), \text{ where}$$

f: a focal length of an entire system, and
f1n: a focal length of the first negative lens counted from the object side in the front group.

7. The imaging lens, as defined in claim 1, wherein an air lens between a first negative lens counted from the object side in the front group and a positive lens that is immediately after this negative lens satisfies the following conditional expression:

$$-0.4 < (Rnr-Rpf)/(Rnr+Rpf) < 0.2 \quad (2), \text{ where}$$

Rnr: a curvature radius of an image-side surface of the first negative lens counted from the object side in the front group, and
Rpf: a curvature radius of an object-side surface of the positive lens that is immediately after the first negative lens counted from the object side in the front group.

8. The imaging lens, as defined in claim 1, wherein the rear group satisfies the following conditional expression:

$$0.1 < f/f2 < 0.5 \quad (4), \text{ where}$$

f: a focal length of an entire system, and
f2: a focal length of the rear group.

9. The imaging lens, as defined in claim 1, wherein the positive lens in the rear group has its convex surface facing the image side.

10. The imaging lens, as defined in claim 1, wherein a first negative lens counted from the object side in the front group satisfies the following conditional expression:

$$-3 < f/f1n < -1.5 \quad (1)', \text{ where}$$

f: a focal length of an entire system, and
f1n: a focal length of the first negative lens counted from the object side in the front group.

11. The imaging lens, as defined in claim 1, wherein an air lens between a first negative lens counted from the object side in the front group and a positive lens that is immediately after this negative lens satisfies the following conditional expression:

$$-0.25 < (Rnr-Rpf)/(Rnr+Rpf) < 0.1 \quad (2)', \text{ where}$$

Rnr: a curvature radius of an image-side surface of the first negative lens counted from the object side in the front group, and
Rpf: a curvature radius of an object-side surface of the positive lens that is immediately after the first negative lens counted from the object side in the front group.

12. The imaging lens, as defined in claim 1, wherein the front group satisfies the following conditional expression:

$$0.7 < f/f1 < 0.95 \quad (3)', \text{ where}$$

f: a focal length of an entire system, and
f1: a focal length of the front group.

13. The imaging lens, as defined in claim 1, wherein the rear group satisfies the following conditional expression:

$$0.15 < f/f2 < 0.4 \quad (4)', \text{ where}$$

f: a focal length of an entire system, and
f2: a focal length of the rear group.

14. The imaging lens, as defined in claim 1, wherein Abbe numbers of all the negative lenses in the front group arranged toward the object side of the stop are greater than or equal to 35.

15. The imaging lens, as defined in claim 14, wherein partial dispersion ratios of all the negative lenses in the front group arranged toward the object side of the stop are less than or equal to 0.6.

16. The imaging lens, as defined in claim 1, wherein an Abbe number of the lens closest to the object side in the front group is less than or equal to 35.

17. The imaging lens, as defined in claim 16, wherein a partial dispersion ratio of the lens closest to the object side in the front group is greater than or equal to 0.58.

18. The imaging lens, as defined in claim 1, wherein the imaging lens includes a cemented lens consisting of the negative lens with its concave surface facing the object side and a positive lens with its convex surface facing the image side in the front group in this order from the object side immediately after the stop counted from the object side, and
wherein an Abbe number of each of the lenses constituting this cemented lens is less than or equal to 25.

19. An imaging apparatus comprising:
the imaging lens, as defined in claim 1.

* * * * *